(12) United States Patent
McCloskey

(10) Patent No.: US 9,207,877 B1
(45) Date of Patent: Dec. 8, 2015

(54) DETECTION AND AVOIDANCE OF STALLED FILESYSTEMS TO PREVENT STALLING OF VIRTUAL TAPE DRIVES DURING TAPE MOUNTS

(75) Inventor: Larry W. McCloskey, Burlington, MA (US)

(73) Assignee: EMC Corporation, Hopkinton, MA (US)

( * ) Notice: Subject to any disclaimer, the term of this patent is extended or adjusted under 35 U.S.C. 154(b) by 341 days.

(21) Appl. No.: 13/435,206

(22) Filed: Mar. 30, 2012

(51) Int. Cl.
*G06F 3/06* (2006.01)
*G06F 11/14* (2006.01)
*G06F 11/07* (2006.01)

(52) U.S. Cl.
CPC .......... *G06F 3/0664* (2013.01); *G06F 11/0712* (2013.01); *G06F 11/1428* (2013.01); *G06F 3/0685* (2013.01); *G06F 11/0757* (2013.01)

(58) Field of Classification Search
None
See application file for complete search history.

(56) References Cited

U.S. PATENT DOCUMENTS

| | | | | |
|---|---|---|---|---|
| 5,805,864 A * | 9/1998 | Carlson et al. | | 703/24 |
| 6,289,425 B1 * | 9/2001 | Blendermann et al. | | 711/170 |
| 7,328,364 B1 * | 2/2008 | Leong et al. | | 714/6.22 |
| 7,467,324 B1 * | 12/2008 | Davda et al. | | 714/6.12 |
| 7,984,324 B2 * | 7/2011 | Daud et al. | | 714/6.1 |
| 8,024,172 B2 * | 9/2011 | Trimmer et al. | | 703/24 |
| 8,041,735 B1 * | 10/2011 | Lacapra et al. | | 707/783 |
| 8,087,021 B1 * | 12/2011 | Holdman et al. | | 718/102 |
| 8,549,360 B2 * | 10/2013 | Masser et al. | | 714/38.12 |
| 2011/0145494 A1 * | 6/2011 | Mitsuma et al. | | 711/111 |

OTHER PUBLICATIONS

Haeusser, Babette "IBM TotalStorage Virtual Tape Server: Planning, Implementing, and Monitoring" IBM Redbooks (8th ed. 2005).*

* cited by examiner

*Primary Examiner* — Kamini S Shah
*Assistant Examiner* — Jay B Hann
(74) *Attorney, Agent, or Firm* — Hamilton, Brook, Smith & Reynolds, P.C.

(57) ABSTRACT

A method for operating a virtual tape emulator that receives a request to access a directory in a disk array including a set of directories. The method includes determining whether the directory is stalled, and if so, preventing access to the directory. In another embodiment, a virtual tape emulator includes a request reception module configured to receive a request to access a directory in a disk array including a set of directories. The virtual tape emulator further includes a stall determination module configured to determine whether the directory is stalled, and an access prevention module configured to prevent access to the directory if the directory is stalled.

16 Claims, 6 Drawing Sheets

DETECTION AND AVOIDANCE OF STALLED FILESYSTEMS TO PREVENT STALLING OF VIRTUAL TAPE DRIVES DURING TAPE MOUNTS

BACKGROUND

A virtual tape storage system can include multiple directories in which virtual tapes are mounted. Directories, and the virtual tapes mounted on the directories, can be accessed by systems coupled with the storage systems. A mainframe can be coupled with an input/output controller which communicates with the virtual tape storage system.

BRIEF DESCRIPTION OF THE DRAWINGS

The foregoing will be apparent from the following more particular description of example embodiments herein, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

In one embodiment, a method includes, within a virtual tape emulator, receiving a request to access a directory in a disk array including a set of directories. The method further includes determining whether the directory is stalled. The method also includes preventing access to the directory if the directory is stalled.

In one embodiment, the request is received from at least one of a mainframe and a user.

In another embodiment, the request is a request to mount a virtual scratch tape file from the disk array. The method further includes determining a plurality of available virtual tapes in the directory. The method also includes mounting one of the plurality of available virtual tapes in the directory as the virtual scratch tape file.

In another embodiment, the request is a request to write a virtual tape in the disk array; and further comprising: The method further includes writing the virtual tape to the directory.

In another embodiment, the request is a request to create a virtual tape file. The method also includes creating the virtual tape file in the directory.

In another embodiment, the request is a request to mount a virtual tape file from the disk array. The method further includes searching for the virtual tape file in the set of directories. The method also includes mounting the virtual tape file, if the virtual tape file is found in the set of directories.

In another embodiment, the method includes, if the directory is stalled, adding the directory to a stalled list. The method further includes, if the virtual tape file is not found after searching for the virtual tape file in the set of directories, searching the stalled list with a higher priority.

In another embodiment, determining whether the directory is stalled further includes requesting, from the directory, a start time and an end time of a most recent input-output request, wherein if the difference of the start time and the end time is greater than a threshold value, the directory is stalled.

In another embodiment, preventing access to the directory if the directory is stalled includes removing the directory from a list of candidate directories or flagging the directory as stalled.

In another embodiment, the directory is multiple directories.

In another embodiment, a virtual tape emulator includes a request reception module configured to receive a request to access a directory in a disk array including a set of directories. The virtual tape emulator further includes a stall determination module configured to determine whether the directory is stalled. The virtual tape emulator also includes an access prevention module configured to prevent access to the directory if the directory is stalled.

A product such as the Data Library for Mainframe (DLm), available from EMC, Inc. of Hopkinton, Mass., is a virtual tape library for an IBM or compatible mainframe.

Figure 1:
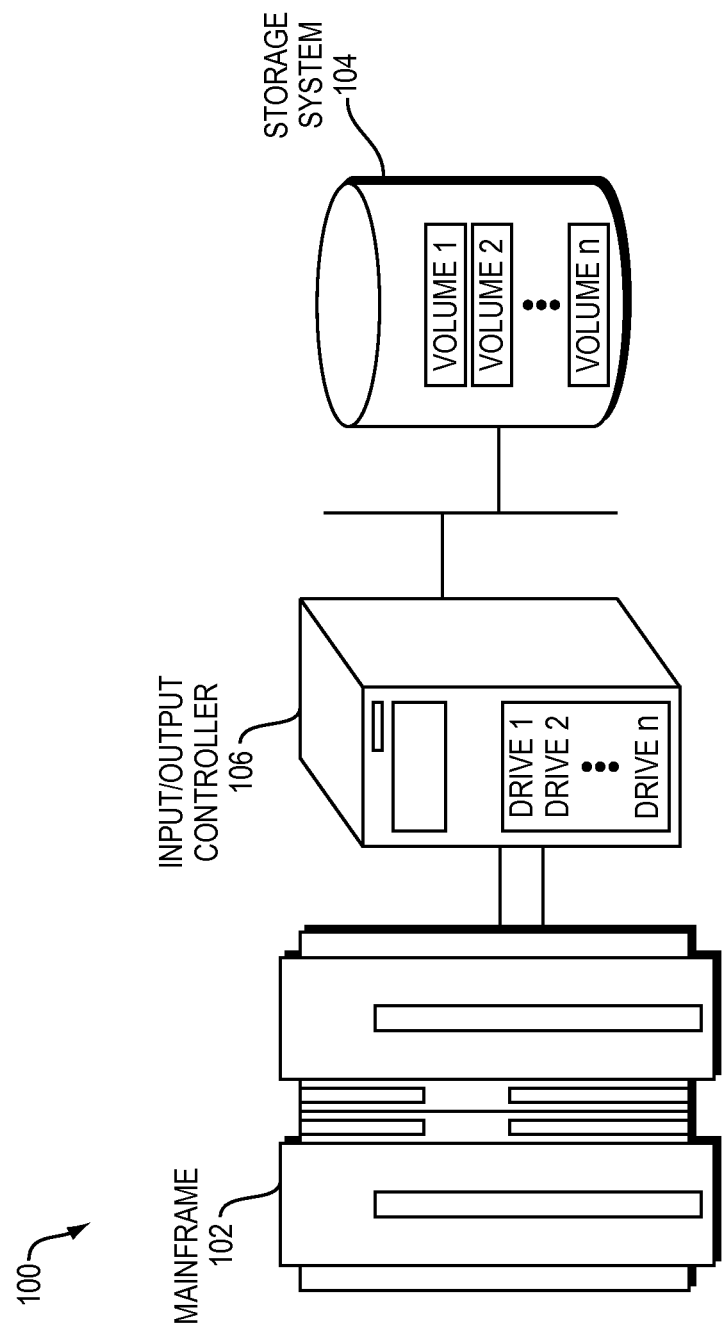
FIG. 1 is a block diagram illustrating a mainframe which is operatively coupled with an input/output controller, which is operatively coupled with a storage system.

FIG. 1 is a block diagram 100 illustrating an example embodiment employing a mainframe 102, which is operatively coupled with an input/output controller 106, which is operatively coupled with a storage system 104. The DLm is an example of an input/output controller 106. The mainframe 102 sends a request to access the storage system 104 through the input/output controller 106. The mainframe 102 can issue at least four different types of requests to the input/output controller 106.

A first request is mounting a virtual scratch tape in the storage system 104. A virtual scratch tape is a temporary virtual tape file mounted in a directory in the storage system 104. The virtual scratch tape file can be mounted in any available directory within the storage system 104. A directory is available to mount a virtual scratch tape file should the following conditions all be true: the directory is writeable, the directory has enough free space to mount the virtual scratch tape file, and the directory is not stalled.

A second request that the mainframe 102 can issue is a request to move a virtual tape to a directory in the storage system 104. In this type of request, the mainframe 102 requests that the input/output controller move a virtual tape file, in one embodiment, from a mounted virtual scratch tape file, to a more permanent virtual tape file in the storage system 104. This type of request causes searching of the storage system 104 to find a directory with appropriate characteristics for the moved virtual tape file, such as being writeable, having enough free space to store the virtual tape file, and not being stalled.

A third request that the mainframe can issue is a request to create a virtual tape file in the storage system 104. This request creates a new virtual tape file in a directory in the storage system 104. This type of request causes searching of the storage system 104 to find a directory with appropriate characteristics to store the new virtual tape file, such as being writeable, having enough free space to store the virtual tape file, and not being stalled.

A fourth request that the mainframe 102 can issue is a request to mount an existing virtual tape file from the storage system 104. The input/output controller 106 searches for the virtual tape file among directories in the storage system 104.

Searching a particular directory for the virtual tape file can hang if the particular directory is stalled or frozen, however.

The system described in the present Application is directed towards preventing attempts to access stalled directories. The four types of requests access directories in the storage system 104. Directories in the storage system 104 can sometimes stall.

When an input/output controller 106 attempts to access a stalled directory, the mainframe 102 can hang or freeze. The input/output controller 106 can be configured to prevent accesses to stalled directories for any mainframe 102 requests to avoid the mainframe 102 hanging or freezing. By preventing (or delaying) accesses to stalled directories, the system can be more stable, reliable, and freeze or hang less frequently.

Figure 2:
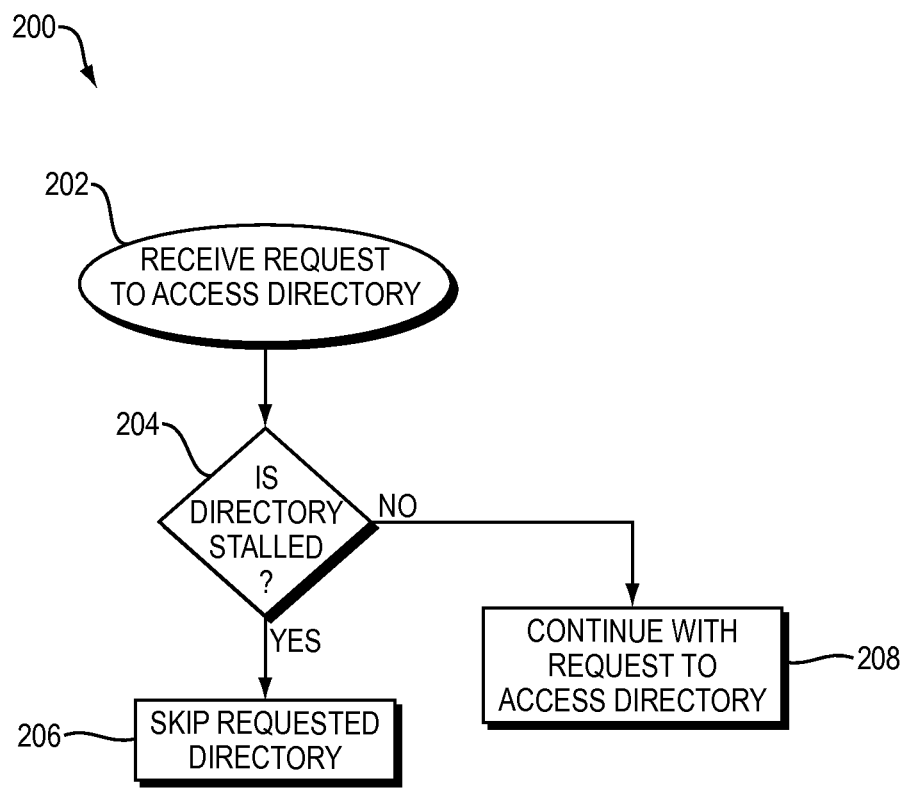
FIG. 2 is a flow diagram illustrating an example embodiment.

FIG. 2 is a flow diagram 200 illustrating an example embodiment. First the system receives a request to access a directory in the storage system (202). A person of ordinary skill in the art can appreciate that a request to access a directory can be a request to access multiple directories, and thus further references herein to one directory should be interpreted as also including multiple directories.

Next, the system determines whether the directory requested is stalled (204). In one embodiment, the directory requested is a single directory. In another embodiment, the request does not specify a specific directory to access, but rather requests access to any available directory, which requires determining whether multiple directories have stalled. Determining whether multiple directories have stalled can be performed either by checking each of the multiple directories sequentially, or all of the multiple directories simultaneously. The steps described below describe determining whether a single directory has stalled, however, a person of ordinary skill in the art can expand this approach to determine, either simultaneously or sequentially, whether multiple directories have stalled.

In one embodiment, the system selects a directory and determines whether the selected directory is stalled. Should the system determine that the directory has stalled, the system skips accessing the requested directory (206). Skipping access to the requested directory prevents the mainframe, or any other peripheral, from freezing or hanging upon an attempt to access the directory. On the other hand, should the directory not be stalled, the system continues with the request to access the directory (208). Examples of continuing with the request include adding the directory to a list of not stalled directories, or accessing the directory.

Figure 3:
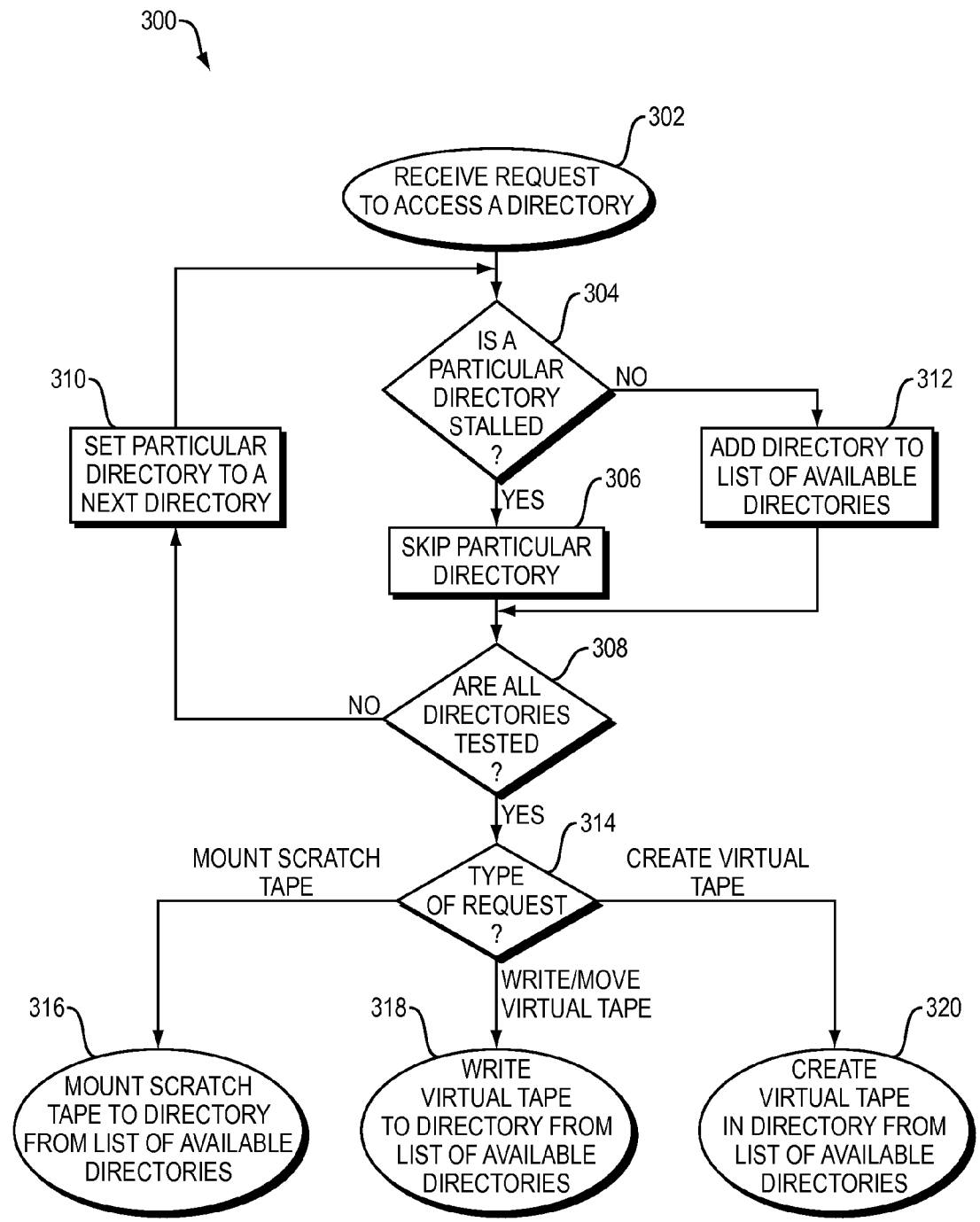
FIG. 3 is a flow diagram illustrating a process to determine stalled directories for different request types.

FIG. 3 is a flow diagram 300 illustrating a process to determine stalled directories for different request types. The system receives a request to access a directory (302). The system determines whether a particular directory is stalled (304). In one embodiment, the mainframe can implicitly or explicitly request access to multiple directories, as described above. Should the request implicitly or explicitly request access to multiple directories, the system can first determine whether a particular directory has stalled, where the particular directory is chosen randomly, arbitrarily, or from a predetermined or fixed directory or list of directories. After the initial particular directory is chosen, other directories in the request can be checked sequentially, randomly, or by any other order, as described below.

Should the particular directory be determined to be stalled (304), the system skips the particular directory that is stalled (306). On the other hand, should the particular directly be determined to not be stalled, the system adds the particular directory to a list of available directories (312). From there, the system again determines whether all directories have been tested (308).

The system determines whether all directories requested have been tested for being stalled (308). If the all the directories have not been tested for being stalled the system sets the particular directory to a next directory. In other words, the system sets up the next directory to be checked for stall status (304).

Should all of the directories be tested, the system determines the type of request it has received (314). A person of ordinary skill in the art can appreciate that this test can occur upon receiving the request (302) or at another time during the process. However, the flow diagram 300 shows determining the type of request at the end of the process illustrated in the flow diagram 300 to explain the process clearly. Should the type of request be a request to mount a virtual scratch tape, the system mounts a virtual scratch tape to a directory from the list of available directories (316). Should the request be a write or move of a virtual tape, the system writes a virtual tape to a directory from the list of available directories (318). Should the type of request be to create a virtual tape, the system creates a virtual tape in a directory from the list of available directories (320).

Figure 4:
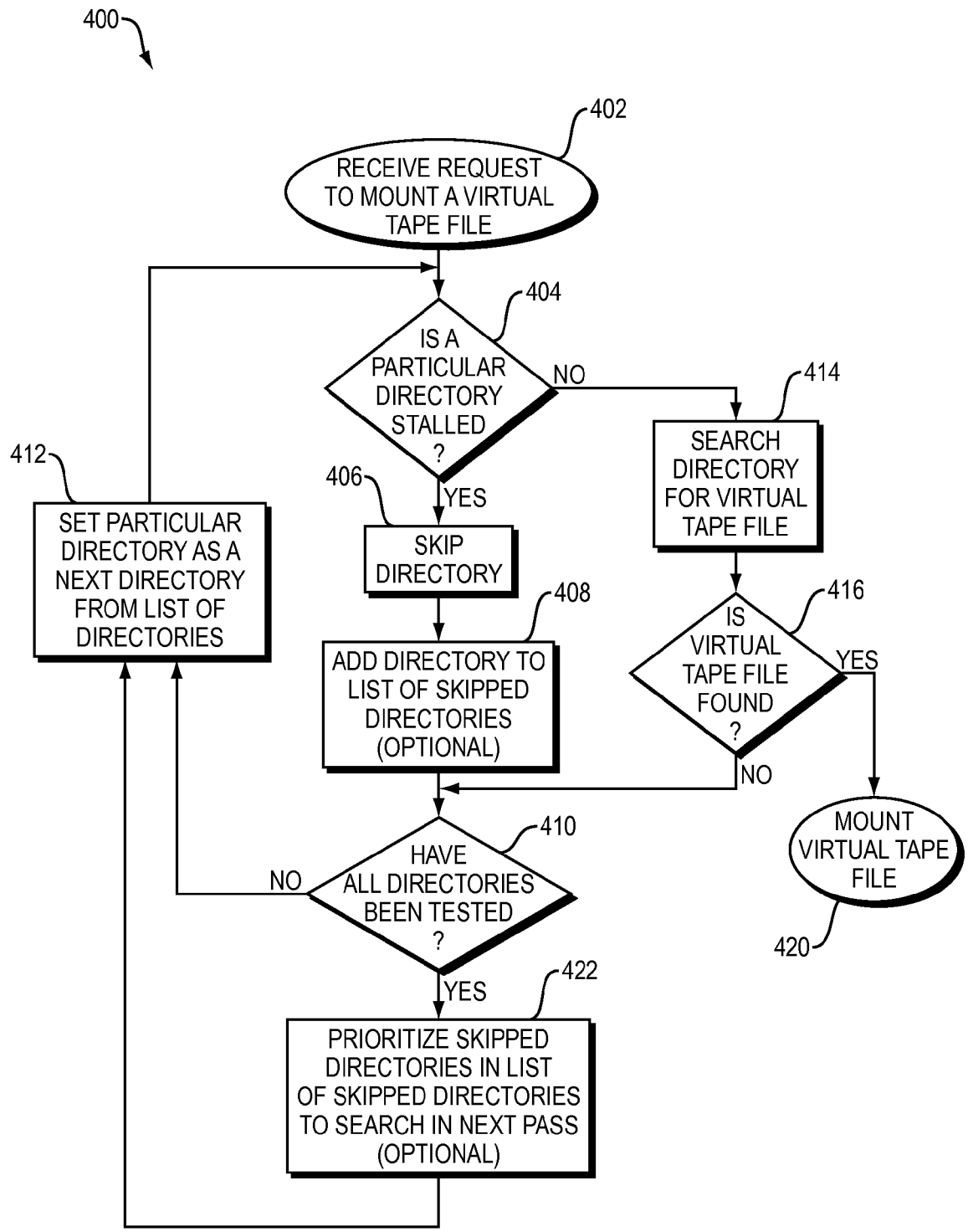
FIG. 4 is a flow diagram illustrating a process to receive a request to mount a virtual tape file.

FIG. 4 is a flow diagram 400 illustrating a process to receive a request to mount a virtual tape file. The system first receives a request to mount a virtual tape file (402). Mounting a virtual tape file generally includes searching/finding the virtual tape file in a directory in the storage system, and mounting the tape from the found directory. Searching for the virtual tape file to mount, however, can access a stalled directory or stalled directories because the directories must be searched to find the virtual tape file.

The system then determines if a particular directory in the search is stalled (404). If the particular directory is stalled, the system skips the directory (406). Optionally the system adds the directory to a list of skipped directories (408). Then, the system determines whether all the directories have been tested (410).

On the other hand, if a particular directory is determined not to be stalled, the system searches the directory for the virtual tape file (414). The system determines whether the virtual tape file is found (416). If the virtual tape file is found, the system mounts the virtual tape file and ends the search (420). If the virtual tape file is not found, the system determines whether all directories have been tested (410).

Should all directories not be tested, the system sets the particular directory as a next directory from a list of directories that are being searched for the virtual tape file (412). The system determines whether the new particular directory is stalled (404). On the other hand, should the system determine that all directories have been tested, the system optionally prioritizes skipped directories from the list of skipped directories to search in the next pass (422). In this optional embodiment, the system prioritizes skip directories because the not stalled directories have already been searched (414), so it is likely that the virtual tape file resides in one of the stalled directories that the system skipped and hasn't yet searched (406). However, the skipped directories must be determined to no longer be stalled for the directory to be searched (414). After prioritizing skipped directories, in the optional embodiment, the system sets the particular directory as a next directory from the list of directories (412). This can be the first directory searched during the first pass of the directories, a random directory, arbitrary directory, a fixed directory, or a prioritized directory of the list of skipped directories.

Figure 5:
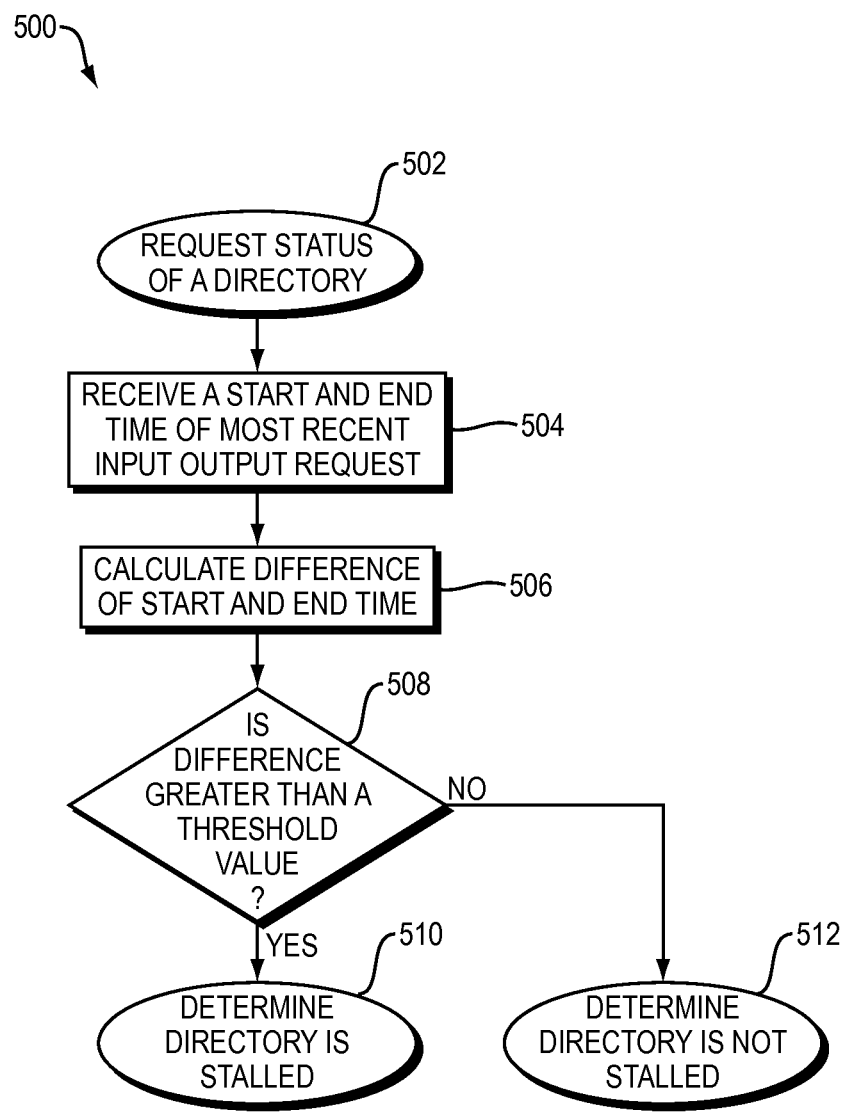
FIG. 5 is a flow diagram illustrating a process which determines whether a directory is stalled.

FIG. 5 is a flow diagram 500 illustrating a process which determines whether a directory is stalled. The system first requests a status of a directory (502). The system employs a dedicated process (or thread) that is associated with each directory. In one embodiment, the dedicated process checks various attributes of the directory, such as writeability, health of the directory, and input/output status. The input/output status includes a start time and an end time of a most recent input/output request. In one embodiment, should the input output request be ongoing or still active, the end time of the input/output status is the present system time.

The system receives the start time and the end time from the status request of the most recent input output request to the directory (504). The system then calculates a difference between the start time and the end time (506). Then the system determines whether the difference is greater than a predetermined threshold value (508). The predetermined threshold value can be any amount of time set by the user or administrator. A person of ordinary skill in the art can now appreciate that increasing the threshold value decreases the system's sensitivity to stalled directories, and decreasing the threshold value increases the system's sensitivity to stalled directories. In one embodiment the threshold value is five minutes. A person of ordinary skill in the art can now appreciate that the threshold value could be any amount of time. In this manner, the difference between the start time and the end time of an ongoing input/output request can be greater than the threshold value. Should the system determine that the difference is greater than the threshold value, the system determines the directory is stalled (510). Should the system determine that the difference is not greater than the threshold value, the system determines that the directory is not stalled (512).

Figure 6:
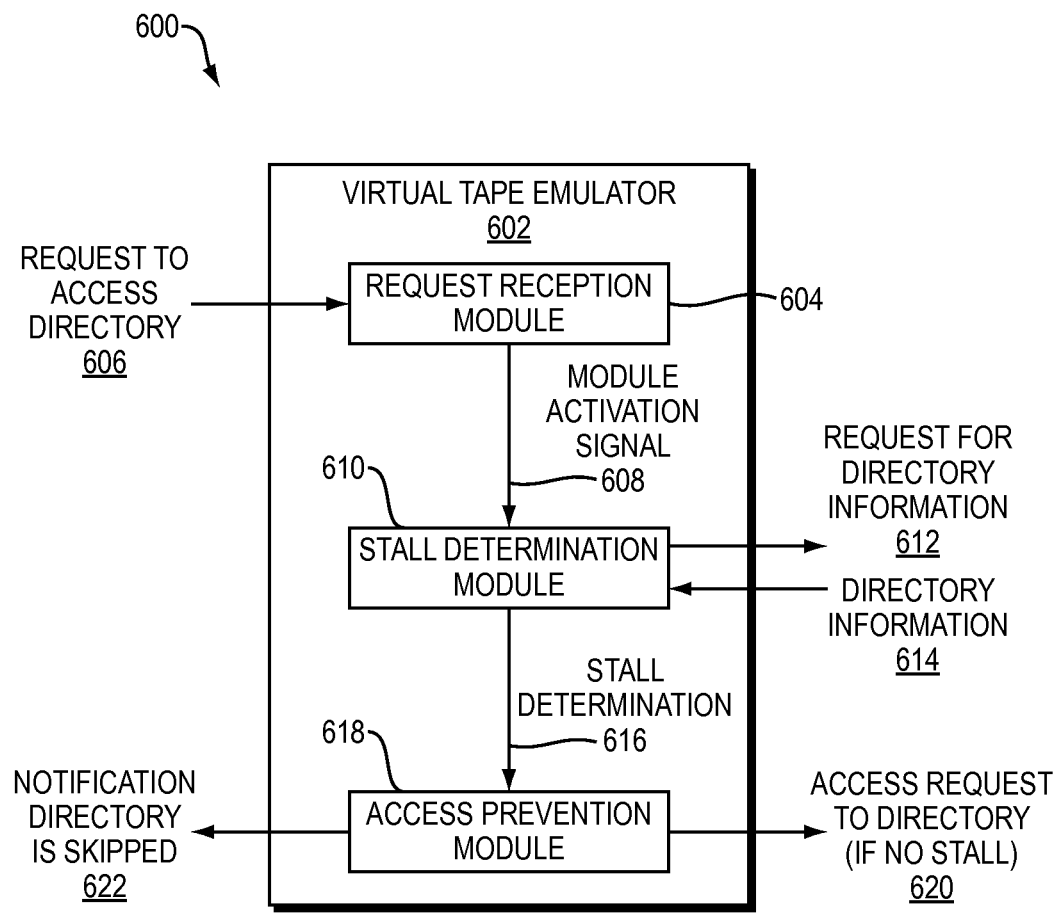
FIG. 6 is a block diagram of a virtual tape emulator.

FIG. 6 is a block diagram 600 of a virtual tape emulator 602. The virtual tape emulator includes a request reception module 604, a stalled determination module 610, and an access prevention module 618. The request reception module 604 receives a request to access a directory 606. As described above the request to access a directory 606 can be a request multiple directories. The request reception module 604 forwards a module activation signal 608 to the stall determination module 610. Upon receiving the module activation signal 608, the stall determination module 610 issues a request for directory information 612 to the storage system. The stall determination module 610 and then receives directory information 614 from the storage system. The stall determination module 610 analyzes the directory information 614 (as further described in relation to FIG. 5) and issues a stall determination 616 to the access prevention module 618. Should the stall determination 616 indicate there is no stall, the access prevention module 618 issues an access request to the requested directory 620. Should the stall determination 616 indicate that the directory is stalled, the access prevention module 618 issues a notification that the directory is skipped 622 to the mainframe.

A person of ordinary skill in the art can appreciate that embodiments or aspects of the method and system described above may be implemented in the form of hardware, software, or firmware. If implemented in software, the software may be any form of software capable of performing operations consistent with the example embodiments disclosed herein. The software may be stored in any non-transient computer readable medium, such as RAM, ROM, magnetic disk, or optical disk. When loaded and executed by processor(s), the processor(s) are configured to perform operations consistent with the example embodiments disclosed herein. The processor(s) may be any form of processor(s) capable of being configured to execute operations as disclosed herein.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
in a virtual tape emulator:
receiving a request to access a directory in a disk array including a set of directories configured to overlay the disk array, thereby delineating a fractional portion of a disk array device or a combination of the fractional portions of two or more disk array devices, wherein the request is a request to mount a virtual tape file from the disk array;
determining whether the directory is stalled;
preventing access to the directory if the directory is stalled, such that access to the fractional portion of the disk array device or the combination of the fractional portions of the two or more disk array devices may be prevented while a remainder of the disk array device or devices may remain accessible;
searching for the virtual tape file in the set of directories;
if the virtual tape file is found in the set of directories, mounting the virtual tape file;
if the directory is stalled, adding the directory to a stalled list;
if the virtual tape file is not found after searching for the virtual tape file in the set of directories, searching the stalled list with a higher priority.

2. The method of claim 1, wherein the request is received from at least one of a mainframe and a user.

3. The method of claim 1, wherein the request is a request to mount a virtual scratch tape file from the disk array; and further comprising:
determining a plurality of available virtual tapes in the directory; and
mounting one of the plurality of available virtual tapes in the directory as the virtual scratch tape file.

4. The method of claim 1, wherein the request is a request to write a virtual tape in the disk array; and further comprising:
writing the virtual tape to the directory.

5. The method of claim 1, wherein the request is a request to create a virtual tape file; and further comprising:
creating the virtual tape file in the directory.

6. The method of claim 1, wherein determining whether the directory is stalled further includes requesting, from the directory, a start time and an end time of a most recent input-output request, wherein if the difference of the start time and the end time is greater than a threshold value, the directory is stalled.

7. The method of claim 1, wherein preventing access to the directory if the directory is stalled includes removing the directory from a list of candidate directories or flagging the directory as stalled.

8. The method of claim 1, wherein the directory is a plurality of directories.

9. A non-transitory computer readable medium storing a virtual tape emulator, wherein the virtual tape emulator comprises:
a request reception module configured to (i) receive a request to access a directory in a disk array including a set of directories configured to overlay the disk array, thereby delineating a fractional portion of a disk array device or a combination of the fractional portions of two or more array devices, and (ii) receive a request to mount a virtual tape drive in the disk array;

a stall determination module configured to determine whether the directory is stalled;

an access prevention module configured to prevent access to the directory if the directory is stalled, such that access to the fractional portion of the disk array device or the combination of the fractional portions of the two or more disk array devices may be prevented while a remainder of the disk array device or devices may remain accessible;

a virtual tape search module configured to search for the virtual tape file in the set of directories;

a virtual tape mounting module configured to mount the virtual tape file, if the virtual tape file is found in the set of directories;

a stalled directory listing module configured to, if at least one directory is stalled, add at least one directory to a stalled list; and a prioritized secondary search module, configured to, if the virtual tape is not found after searching for the virtual tape file in the set of directories, search the stalled list with a higher priority.

10. The non-transitory computer readable medium storing the virtual tape emulator of claim 9, wherein the request reception module is further configured to receive the request from at least one of a mainframe and a user.

11. The non-transitory computer readable medium storing the virtual tape emulator of claim 9, wherein the request reception module is further configured to receive a request to mount a scratch tape file in the disk array; and further comprising:

an available virtual tape determination module configured to determine a plurality of available virtual tapes in the directory; and a mounting module configured to mount one of the plurality of available virtual tapes in the directory as the scratch tape.

12. The non-transitory computer readable medium storing the virtual tape emulator of claim 9, wherein the request reception module is further configured to receive a request to write a virtual tape in the disk array; and further comprising:

a virtual tape writing module configured to write the virtual tape to the directory.

13. The non-transitory computer readable medium storing the virtual tape emulator of claim 9, wherein the request reception module is further configured to receive a request to create a virtual tape; and further comprising:

a virtual tape creation module configured to create the virtual tape file in the directory.

14. The non-transitory computer readable medium storing the virtual tape emulator of claim 9, wherein the stall determination module is further configured to request, from at least one directory, a start time and an end time of a most recent input-output request, wherein if the difference of the start time and the end time is greater than a threshold value, the directory is stalled.

15. The non-transitory computer readable medium storing the virtual tape emulator of claim 9, wherein the access prevention module is further configured to remove the directory from a list of candidate directories or flag the directory as stalled.

16. The non-transitory computer readable medium storing the virtual tape emulator of claim 9, wherein the directory is a plurality of directories.

* * * * *